United States Patent [19]

Bergeron

[11] Patent Number: 4,599,862
[45] Date of Patent: Jul. 15, 1986

[54] TURBOCHARGER FOR TWO-CYCLE ENGINES AND METHOD OF OPERATION THEREOF

[76] Inventor: Robert M. Bergeron, 27 Ball Ave., North Salem, N.H. 03073

[21] Appl. No.: 698,601

[22] Filed: Feb. 5, 1985

[51] Int. Cl.[4] .............................................. F02B 37/00
[52] U.S. Cl. .................................... 60/605; 184/6.11; 184/6.26
[58] Field of Search ............. 60/605; 123/196 R, 559; 184/6.11, 6.26; 417/407

[56] References Cited

U.S. PATENT DOCUMENTS

| 2,201,693 | 5/1940 | Heess et al. | 123/559 |
| 2,227,267 | 12/1940 | Lozivit | 123/559 X |
| 2,740,394 | 4/1956 | Judson et al. | 123/196 |
| 2,784,551 | 3/1957 | Karlby et al. | 60/261 |
| 3,102,332 | 9/1963 | Bozzola | 60/602 |
| 3,200,580 | 8/1965 | Millar | 60/605 |
| 3,903,854 | 9/1975 | Shelton | 123/65 |
| 4,171,611 | 10/1979 | Hueller | 60/39.08 |
| 4,320,724 | 3/1982 | Takada et al. | 123/73 |
| 4,414,929 | 11/1983 | Sakurai | 123/73 |

FOREIGN PATENT DOCUMENTS 2209909  10/1973  Fed. Rep. of Germany ........ 60/605

Primary Examiner—Michael Koczo
Attorney, Agent, or Firm—Hayes, Davis & Soloway

[57] ABSTRACT

A turbocharger particularly adapted for use with two-cycle engines and including provision for lubrication at both high and low speeds as well as automatic enriching of the fuel mixture during turbo boost. The shaft is mounted within a housing on a pair of ball bearings. A seal is provided between the exhaust-driven turbine and the adjacent bearing to prevent exhaust gases from entering. A conduit is provided communicating between the other bearing and an intake portion of the compressor. A first hose is connected to draw oil mist from the crankcase into the housing adjacent the bearing at the exhaust turbine end whereby the oil mist is drawn through the bearings and into the compressor to provide lubrication at least at low engine RPM. Additionally, a hose is provided communicating between the same point of entry as the oil mist and a source of fuel-/oil mixture under pressure related to the intake manifold pressure such that at higher RPM and under boost pressures, a fuel/oil mixture is drawn through the bearings and into the compressor to lubricate and cool the bearings as well as provide a source of enriching fuel to the pressurized airstream entering the air/fuel mixture of the engine.

24 Claims, 6 Drawing Figures

TURBOCHARGER FOR TWO-CYCLE ENGINES AND METHOD OF OPERATION THEREOF

BACKGROUND OF THE INVENTION

The present invention relates to turbocharging systems and, more particularly, to a turbocharger for use on two-cycle engines wherein oil mist is drawn from the crankcase to lubricate ball bearings supporting the shaft of the turbocharger during idle and low RPM and fuel/oil mixture is drawn through the bearings and into the air being pressurized by the compressor of the turbocharger to simultaneously lubricate the bearings while providing a source of enriching fuel mixture to the engine during turbine boost.

Recently, turbocharging has become a very common method of obtaining additional power from engines. While superchargers of the mechanical type were large, noisy, expensive, and cumbersome, modern turbochargers, driven by exhaust gases, are small, relatively inexpensive, light weight, and easily incorporated on a multitude of vehicles from motorcycles to luxury sedans. The addition of a turbocharger to a typical 235 horsepower production V-6 outboard engine, for example, can increase the peak power from 235 SAE horsepower at 5800 RPM to 330 SAE horsepower at 6800 RPM with approximately one atmosphere of pressure boost.

Turbobchargers obtain their performance by using speed instead of size. A shaft is provided with a turbine on either end. Exhaust gases are conducted to drive the one turbine to thereby spin the shaft and the opposite turbine which is used to draw in and compress air which is then used as part of the air/fuel mixture of the engine. To obtain the pressures and flow volumes required, a typical turbocharger may idle at or about 10,000 RPM and reach speeds of 20,000-80,000 RPM as its operating speeds. As can be realized, between the operating speeds and the fact that the metal components are being driven by hot exhaust gases from the engine, cooling and lubrication of the shaft and bearings supporting the two turbines becomes a major problem. With a four-cycle engine, the problem can be solved since there is a source of circulating oil which can be routed to cool and lubricate the shaft and its conventional floating bushings.

Two-cycle engines, on the other hand, provide a severe problem to the effective incorporation of a turbocharger boosting system. The typical valves, camshaft, etc., of the four-cycle engine are missing, as is the pressurized oil system utilized to lubricate those members. The lower members of the engine components, the upper cylinder walls, and the like, are lubricated by mixing oil in with the gasoline.

An additional consideration with all turbocharger systems is the requirement for enriching the fuel as the boost pressure rises.

To date, no one has successfully solved the above-described problems for two-cycle engines. A partial solution is shown in FIG. 1 which corresponds to FIG. 2 from U.S. Pat. No. 3,200,580 of G. H. Millar. In the Millar apparatus, the turbocharger, generally indicated as 10, has a housing 12 supporting a shaft 14 therein on a pair of ball bearings 16 for rotation. One end of the shaft 14 is connected to a turblne 18 which is rotated by exhaust gases 20 entering at 22 and exiting at 24. The opposite end of shaft 14 is connected to a compressor 26 which draws air 28 in at 30 and outputs pressurized air 32 through conduit 34 which is connected to the air intake of carburetor 36. There is a seal 38 at the air end of the shaft 14 and another seal 40 at the exhaust end of the shaft 14. Thus, the ball bearings 16 within the housing 12 are contained within a compartment 42 completely sealed off from either of the turbines 18, 26. To provide lubrication and cooling, the gasoline line 44 normally connected between the fuel pump 46 and the carburetor 36 is broken and routed to pass the fuel/oil mixture, as indicated by the arrows 48, through compartment 42 to cool and lubricate the ball bearings 16. The fuel/oil mixture 48 enters through passageway 50, passes through the two bearings 16, and exits through passageway 52. This system has several shortcomings. Firstly, no ball bearing system should be operated at high speed with the bearings submerged as severe foaming would occur. Secondly, Millar's design would require a liquid tight seal at each end of the shaft. No seal is presently available that would stand both the speed (80,000 plus RPM) and temperature (1300+F.) at the turbine end of the shaft. Also, the use of submerged bearings would cause undesirable drag on the bearings and rotating assembly. Additionally, any contaminants introduced into the fuel/oil mixture 48 within the turbocharger 10 would be passed on to possibly clog the carburetor 36. Finally, no provision is made for fuel enriching.

Wherefor, it is the object of the present invention to provide a practical method of lubricating the supporting shaft and bearings of a turbocharger used on two-cycle engines while, simultaneously, providing an automatic means for enriching the fuel mixture in relation to boost pressures being applied.

SUMMARY

The foregoing objectives have been accomplished by the lubricating system of the present invention for a turbocharger for a two-cycle engine having an oil and oil mist containing crankcase and burning a mixture of liquid fuel containing lubricating oil therein wherein the turbocharger comprises a shaft mounted in a housing for rotation by an exhaust-driven turbine on one end to drive a compressor on the other end connected to supply air for the fuel/air mixture of the engine, a pair of ball or roller bearings supporting the shaft for rotation within the housing adjacent the respective ends of the shaft, and sealing means disposed between the exhaust-driven turbine and the adjacent one of the bearings for blocking the passage of exhaust gases into the housing comprising means for allowing oil mist to pass through the bearings between the crankcase and an intake portion of the compressor at least at low engine RPM's; and, means for allowing liquid fuel/oil mixture to pass through the bearings and into an intake portion of the compressor to enter the air being pressurized by the air pressurizing turbine at high engine RPM's, whereby the oil mist is drawn out of the crankcase and through the bearings to provide lubrication at low engine RPM's and, additionally, at high engine RPM's, fuel containing lubricating oil passes through the bearings and out to join the pressurized air being created by the air pressurizing turbine to provide additional lubrication and cooling of the bearings while simultaneously and automatically enriching the air/fuel mixture.

DESCRIPTION OF THE PREFERRED EMBODIMENT

Figure 1:
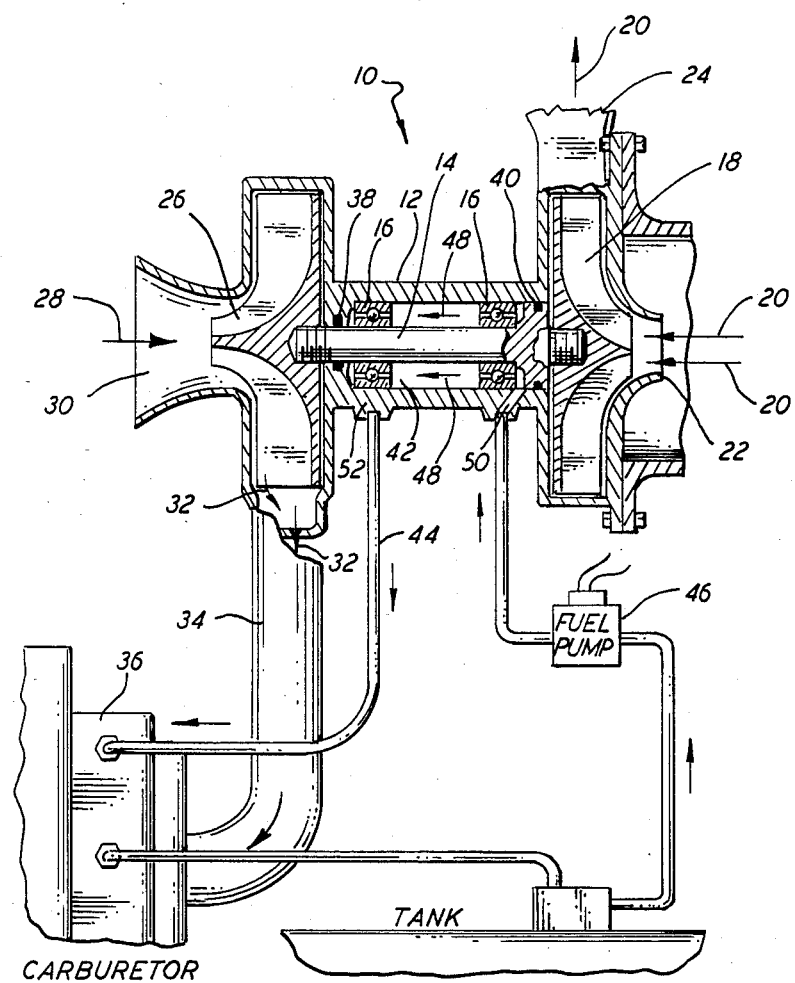
FIG. 1 is a partially cut away view of a prior art lubricating system for a turbocharger for a two-cycle engine.
Figure 2:
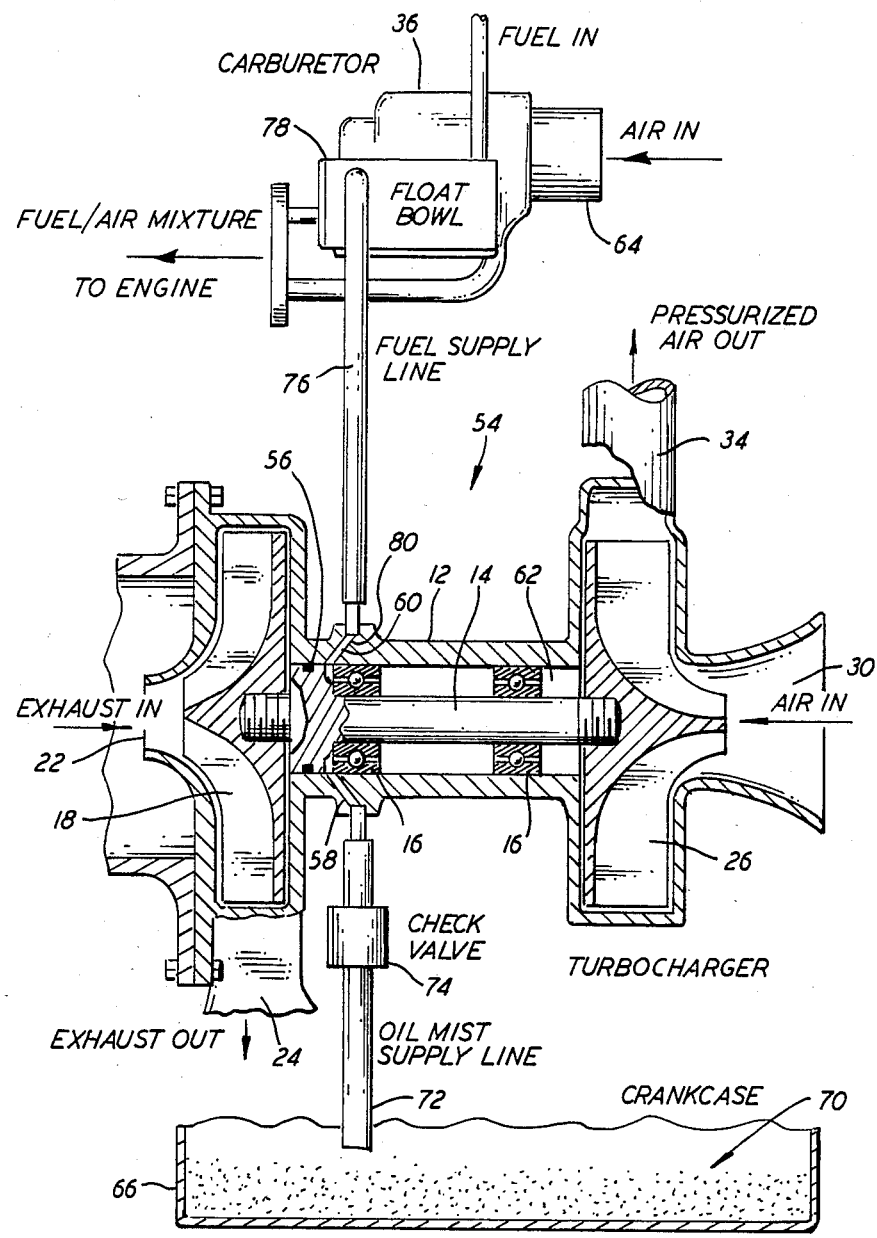
FIG. 2 is a partially cut away view showing the components of the lubricating system of the present invention in a first embodiment.

Turning first to FIG. 2, the present invention is shown in a first embodiment as employed with blow-through carbureted applications. For simplicity, only those elements necessary to the present invention are shown. The turbocharger is generally indicated as 54 and contains many of the same components as previously described with respect to FIG. 1 which are designated with like numerals for ease of understanding and comparison. Turbocharger 54 has a housing 12 with a shaft 14 mounted on a pair of ball bearings 16. There is an exhaust-driven turbine 18 on one end and a compressor 26 on the opposite end. A single seal 56 is provided between the shaft 14 and the inner surface of the housing 12 adjacent the exhaust-driven turbine 18 to prevent substantial exhaust gases from entering the housing 12. In the preferred embodiment, a conventional piston ring is used for this purpose. Housing 12 is provided with two passageways 58, 60 communicating from outside of the housing 12 to a position within housing 12 between the seal 56 and the adjacent ball bearing 16. The opposite end of the shaft 14 passes through an enlarged bore 62 which defines a conduit communicating between the inside of housing 12 adjacent the closest ball bearing 16 and an air intake portion of the compressor 26. While the physical connection is not shown, those skilled in the art will understand that the pressurized air outlet conduit 34 is connected to the air inlet 64 of carburetor 36. As previously described under Background of the Invention, the engine includes a crankcase 66 containing a quantity of fuel oil air mix or oil mist 70 therein. Characteristic of the engine, in operation, an alternating positive/negative pressure is created within the crankcase 66. According to a first aspect of the present invention, an oil mist supply hose 72 is connected between the crankcase 66 and passageway 58 being positioned to draw in a portion of the oil mist 70. A check valve 74 is connected to allow flow through hose 72 only in a direction out of the crankcase 66.

According to a second aspect of the present invention, a fuel supply hose 76 is connected between the float bowl 78 of the carburetor 36 and the other passageway 60. A metering orifice nozzle 80 is disposed within passageway 60 to limit the volume flow of fuel therethrough to a desired amount in a manner well known to those skilled in the art.

Figure 3:
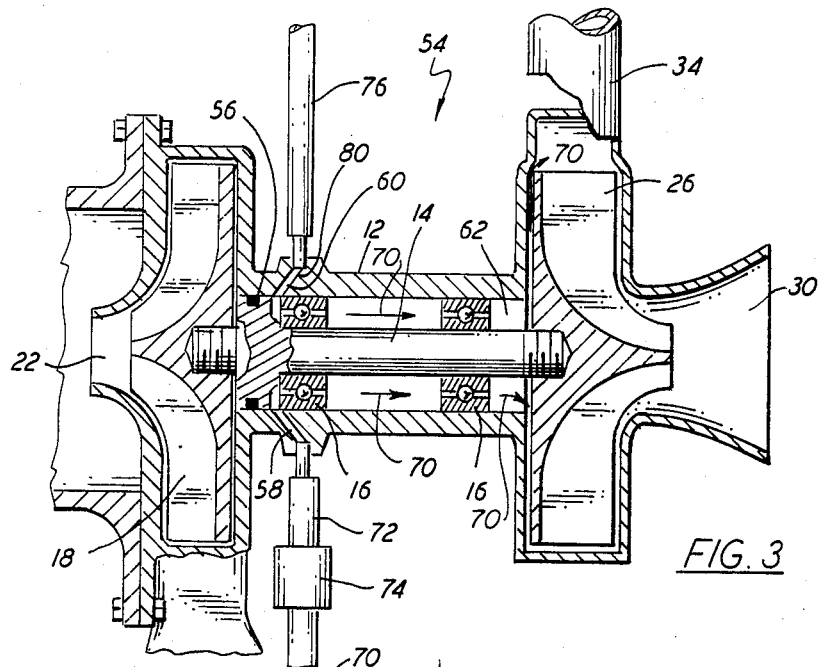
FIG. 3 is a cut away view of the turbocharger of FIG. 2 showing the flow of lubricating fluids at idle speeds.

Turning now to FIG. 3, the flow at idle and low engine RPM is shown. Oil mist 70 is drawn out of the crankcase 66, through hose 72 and check valve 74 into passageway 58 from whence it passes through the bearings 16 and out the bore 62 around shaft 14 to enter the air stream being pressurized by the turbine 26. At this point, there is insufficient pressure within the float bowl 78 to cause the fuel/oil mixture within the float bowl 78 to pass through the metering orifice nozzle 80.

Figure 4:
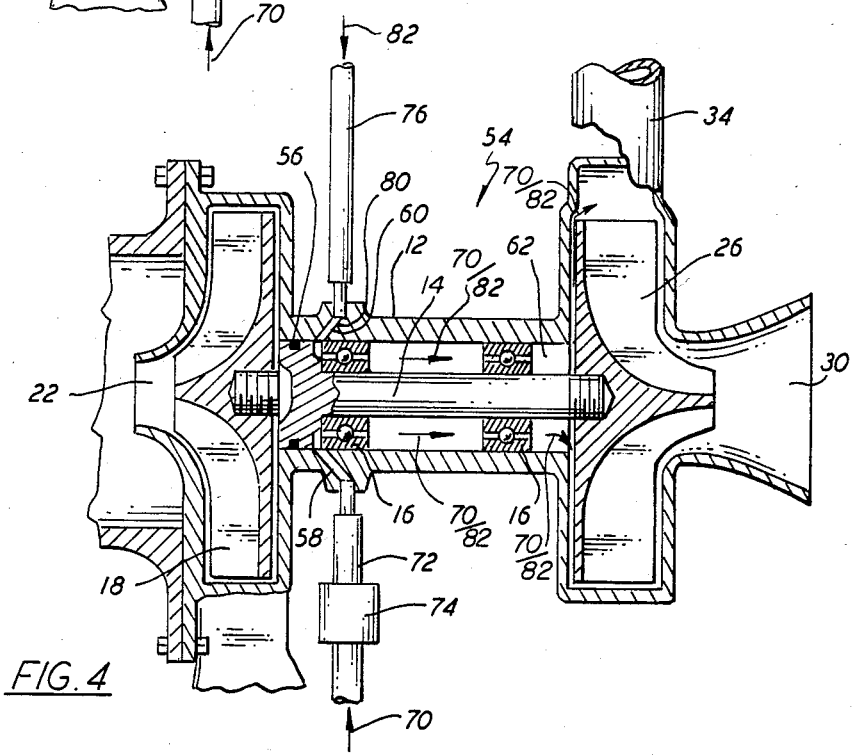
FIG. 4 shows the turbocharger of FIG. 2 and the lubricating flow at high RPM.

Turning now to FIG. 4, the flow at higher engine RPM's is shown. Oil mist 70 continues to be drawn through hose 72. Additionally, however, as the boost air pressure increases, a positive pressure is created within the float bowl 78. This pressure is proportional to the amount of boost pressure being applied by the turbocharger 54. As this pressure increases, and the pressure at bore 62 does not increase, fuel 82 containing oil therein is drawn through the orifice nozzle 80 and into passageway 60 from whence it passes through the bearings 16 and out bore 62 to enter into the air stream being pressurized by the compressor 26. The orifice nozzle 80 is sized in a manner well known to those skilled in the art so that the amount of fuel 82 being drawn through the bearing 16 and entering the compressor 26 is in the desired quantity to provide the enriching fuel for the air/fuel mixture being supplied by carburetor 36 to the engine.

Figure 5:
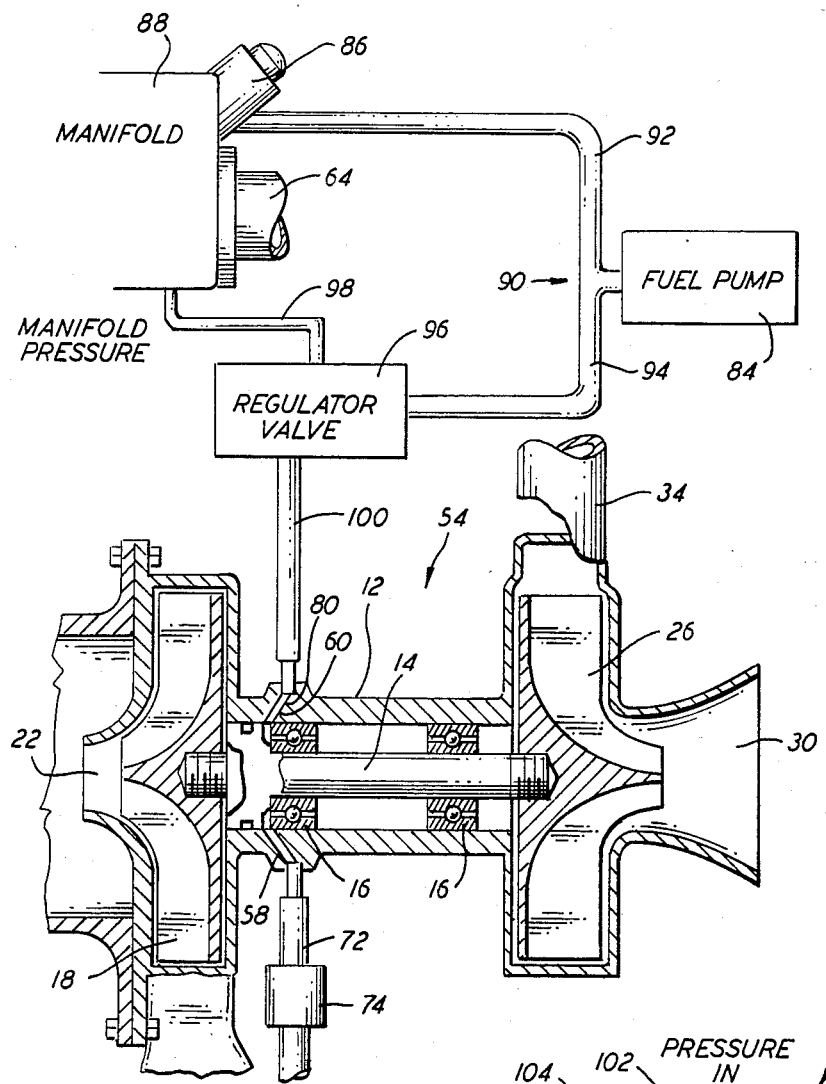
FIG. 5 shows an alternate embodiment of the present invention.
Figure 6:
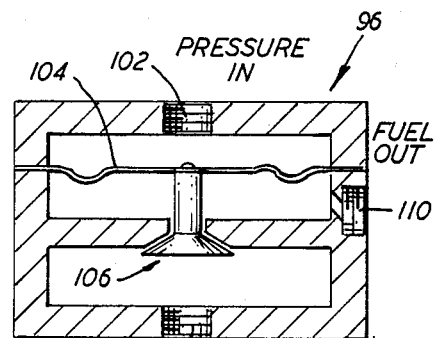
FIG. 6 is a simplified cut away drawing through the pressure regulator valve employed in the embodiment of FIG. 5.

Turning now to FIGS. 5 and 6, the present invention is shown in an alternate embodiment as applied to non blow-through applications such as fuel injection and the like. In such applications, a fuel pump 84 provides fuel under pressure to injectors 86 while the conduit 34 from the compressor 26 is connected to the air intake by way of an intake manifold 88. The oil mist supplying portion of the present invention remains the same. To provide the lubricating/enriching fuel mixture, however, the output line from the fuel pump 84 is T'd at 90 with one portion of the fuel line 92 being connected to the injectors 86 while the other portion of the fuel line 94 is connected to the input of a regulator valve 96. A pressure input line 98 is connected between the intake manifold 88 and the regulator valve 96 such that a hose 100 connected to the outlet of the regulator valve 96 receives fuel 82 therein at a pressure directly related to the manifold pressure. Hose 100, in turn, is connected to passageway 60 to operate substantially in the same manner as previously described.

The regulator valve 96 is shown in simplified form in FIG. 6 and is of a construction well known to those skilled in the art. The manifold pressure entering at 102 presses against a diaphragm 104 which controls a valve member 106 disposed in the path between the fuel inlet at 108 and the fuel outlet at 110 and acting on the opposite side of the diaphragm 104 in typical regulator valve fashion.

As can thus be realized, in both embodiments, fuel enters passageway 60 from a source of fuel at a pressure directly related to the boost pressure being applied to the engine such that the amount of fuel being added to the pressurized airstream from the compressor 26 is automatically adjusted to the amount of boost pressure being applied.

Thus, it can be seen that the present invention has fulfilled its obligations by providing not only a source of lubrication for the bearings 16 of the turbocharger 54 which varies according to engine RPM but, additionally, the fuel to the engine is not contaminated and the mixture is automatically enriched as boost pressures increase.

Wherefore, having thus described my invention, I claim:

1. In a turbocharger for a two-cycle engine having an oil mist containing crankcase and burning a mixture of liquid fuel containing lubricating oil therein wherein the turbocharger comprises a shaft mounted in a housing for rotation by an exhaust-driven turbine on one end to drive a compressor on the other end connected to supply pressurized air for the fuel/air mixture of the engine, the improvement to supply lubrication to the shaft and automatically enrichen the fuel/air mixture during high speed turbocharging compising:
 (a) a pair of ball bearings supporting the shaft within the housing adjacent respective ends of the shaft;
 (b) sealing means disposed between the exhaust-driven turbine and the adjacent one of said bearings for blocking the passage of exhaust gasses into said housing;
 (c) a first conduit in the housing communicating between an intake portion of the air pressurizing turbine and the adjacent one of said bearings;
 (d) second and third conduits in the housing communicating from outside the housing to a point inside the housing between said sealing means and said one of said bearings adjacent thereto;
 (e) a fourth conduit connected between the crankcase and said second conduit; and,
 (f) a fifth conduit connected between said third conduit and a source of the liquid fuel at a pressure directly related to the rpm's of the engine, whereby the oil mist is drawn out of the crankcase, through said bearings, and out of said first conduit to provide lubrication at low engine rpm's and, additionally, at high engine rpm's, fuel containing lubricating oil passes through said bearings and out said first conduit to join the pressurized air being created by the air pressurizing turbine to provide additional lubrication and cooling of said bearings while simultaneously enriching the air/fuel mixture.

2. The improvement of claim 1 wherein:
said fourth conduit contains a check valve in line therewith to permit flow in said fourth conduit only out of the crankcase.

3. The improvement of claim 1 wherein:
said third conduit contains a metering orifice nozzle therein adapted to restrict the volume flow of fuel to the proper amount for the stated purposes.

4. The improvement of claim 1 wherein:
 (a) the engine is a blow-through carbureted engine having at least one carburetor having a fuel bowl;
 (b) said source of liquid fuel is at least one said fuel bowl; and
 (c) said fifth conduit is a hose connected between said fuel bowl and said third conduit, whereby as the turbocharger boost is increased the pressure in said bowl increases in pressure until it exceeds the pressure in said housing at which time the liquid fuel/oil mixture flows through said hose into said housing and thence through said bearings and out said first conduit.

5. The improvement of claim 1 wherein:
 (a) the engine is a non-blow-through engine employing fuel injection, or the like, using fuel under pressure from a fuel pump; and
 (b) said source of liquid fuel is the output of a regulator valve means connected to receive fuel from said fuel pump and controlled by a line sensing intake manifold pressure of the engine for outputting fuel at said output at a pressure directly related to said manifold pressure, whereby both lubrication of said bearings and enrichment of the fuel/air mixture to the engine increase and decrease in direct relationship to increases and decreases in the turbo boost being applied to the engine.

6. A turbocharger for use with two-cycle engines burning a liquid fuel/oil and air mixture and having an oil and oil mist containing crankcase comprising:
 (a) a shaft mounted in a housing for rotation by an exhaust-driven turbine on one end to drive a compressor on the other end connected to supply pressurized air for the fuel/air mixture of the engine;
 (b) a pair of ball bearings supporting the shaft for rotation within the housing disposed adjacent respective ends of the shaft;
 (c) sealing means disposed between the exhaust-driven turbine and the adjacent one of said bearings for blocking the passage of exhaust gasses into said housing;
 (d) a first conduit in the housing communicating between an intake portion of the compressor and the adjacent one of said bearings;
 (e) second and third conduits in the housing communicating from outside the housing to a point inside the housing between said sealing means and said one of said bearings adjacent thereto;
 (f) means for allowing oil mist to pass through said bearings between said second conduit and said first conduit at least at low engine rpm's; and,
 (g) means for allowing liquid fuel/oil mixture to pass through said bearings between said third conduit and said first conduit and enter the air being pressurized by said air pressurizing turbine at high engine rpm's.

7. The turbocharger of claim 6 wherein:
said oil mist passage allowing means comprises a first hose connected between the crankcase and said second conduit and positioned to draw in the oil mist in the crankcase.

8. The turbocharger of claim 7 and additionally comprising:
check valve means disposed in line with said first hose for permitting flow therethrough only out of the crankcase.

9. The turbocharger of claim 6 wherein:
 (a) the engine is a blow-through carbureted engine having at least one carburetor having a fuel bowl;
 (b) said source of liquid fuel is at least one said fuel bowl; and
 (c) said fifth conduit is a hose connected between said fuel bowl and said third conduit, whereby as the turbocharger boost is increased the pressure in said bowl increases in pressure unit it exceeds the pressure in said housing at which time the liquid fuel/oil mixture flows through said hose into said housing and thence through said bearings and out said first conduit.

10. The turbocharger of claim 6 wherein:
 (a) the engine is a non-blow-through engine using fuel under pressure from a fuel pump; and
 (b) said source of liquid fuel is the output of a regulator valve means connected to receive fuel from said fuel pump and controlled by a line sensing intake manifold pressure of the engine for outputting fuel at said output at a pressure directly related to said manifold pressure, whereby both lubrication of said bearings and enrichment of the fuel/air mixture to the engine increase and decrease in direct relationship to increases and decreases in the turbo boost being applied to the engine.

11. A turbocharger for use with a two cycle engine burning a liquid fuel/oil and air mixture comprising:
   (a) a shaft mounted in a housing for rotation by an exhaust-driven turbine on one end to drive a compressor on the other end connected to supply air for the fuel/air mixture of the engine;
   (b) a pair of ball bearings supporting the shaft for rotation within the housing disposed adjacent respective ends of the shaft;
   (c) sealing means disposed between the exhaust-driven turbine and the adjacent one of said bearings for blocking the passage of exhaust gasses into said housing;
   (d) a first conduit in the housing communicating between an intake portion of the compressor and the adjacent one of said bearings;
   (e) a second conduit in the housing communicating from outside the housing to a point inside the housing between said sealing means and said one of said bearings adjacent thereto; and
   (f) means for allowing liquid fuel/oil mixture to pass through said bearings between said second conduit and said first conduit and enter the air being pressurized by said compressor at high engine rpm's.

12. The turbocharger of claim 11 wherein:
   (a) the engine is a blow-through carbureted engine having at least one carburetor having a fuel bowl;
   (b) the source of said liquid fuel is at least one said fuel bowl; and,
   (c) said allowing means is a hose connected between said fuel bowl and said second conduit, whereby as the turbocharger boost is increased the pressure in said bowl increases in pressure until it exceeds the pressure in said housing at which time the liquid fuel/oil mixture flows through said hose into said housing and thence through said bearings and out said first conduit.

13. The turbocharger of claim 11 wherein:
   (a) the engine is a non-blow-through engine using fuel under pressure from a fuel pump; and
   (b) the source of said liquid fuel is the output of a regulator valve means connected to receive fuel from said fuel pump and controlled by a line sensing intake manifold pressure of the engine for outputting fuel at said output at a pressure directly related to said manifold pressure;
   (c) said allowing means is a hose connected between said output and said second conduit, whereby both lubrication of said bearings and enrichment of the fuel/air mixture to the engine increase and decrease in direct relationship to increases and decreases in the turbo boost being applied to the engine.

14. A turbocharger for use with two cycle engines burning a liquid fuel/oil and air mixture and having an oil and oil mist containing crankcase comprising:
   (a) a shaft mounted in a housing for rotation by an exhaust-driven turbine on one end to drive a compressor on the other end connected to supply air for the fuel/air mixture of the engine;
   (b) a pair of ball bearings supporting the shaft for rotation within the housing adjacent respective ends of the shaft;
   (c) sealing means disposed between the exhaust-driven turbine and the adjacent one of said bearings for blocking the passage of exhaust gasses into said housing;
   (d) a first conduit in the housing communicating between an intake portion of the compressor and the adjacent one of said bearings;
   (e) a second conduit in the housing communicating from outside the housing to a point inside the housing between said sealing means and said one of said bearings adjacent thereto; and,
   (f) means for allowing oil mist to pass through said bearings between said second conduit and said first conduit at least at low engine rpm's.

15. The turbocharger of claim 14 wherein:
said allowing means comprises a first hose connected between the crankcase and said second conduit and positioned to draw in the oil mist from the crankcase.

16. The turbocharger of claim 14 and additionally comprising:
   (a) a third conduit in the housing communicating from outside the housing to a point inside the housing between said sealing means and said one of said bearings adjacent thereto; and
   (b) means for allowing liquid fuel/oil mixture to pass through said bearings between said third conduit and said first conduit and enter the air being pressurized by said compressor at high engine rpm's.

17. The turbocharger of claim 16 wherein:
   (a) the engine is a blow-through carbureted engine having at least one carburetor having a fuel bowl:
   (b) the source of said liquid fuel is at least one said fuel bowl; and,
   (c) said liquid fuel/oil mixture passage allowing means is a hose connected between said fuel bowl and said third conduit, whereby as the turbocharger boost is increased the pressure in said bowl increases in pressure until it exceeds the pressure in said housing at which time the liquid fuel/oil mixture flows through said hose into said housing and thence through said bearings and out said first conduit.

18. The turbocharger of claim 16 wherein:
   (a) the engine is a non-blow-through engine using fuel under pressure from a fuel pump; and,
   (b) the source of said liquid fuel is the output of a regulator valve means connected to receive fuel from said fuel pump and controlled by a line sensing intake manifold pressure of the engine for outputting fuel at said output at a pressure directly related to said manifold pressure;
   (c) said liquid fuel/oil mixture passage allowing means is a hose connected between said output and said second conduit, whereby both lubrication of said bearings and enrichment of the fuel/air mixture to the engine increase and decrease in direct relationship to increases and decreases in the turbo boost being applied to the engine.

19. A turbocharger for use with a two-cycle engine having at least one carburetor with a fuel bowl and burning a liquid fuel/oil and air mixture comprising:
   (a) a shaft mounted in a housing for rotation by an exhaust-driven turbine on one end to drive a compressor on the other end connected to supply pressurized air for the fuel/air mixture of the engine;
   (b) a pair of ball bearings supporting the shaft for rotation within the housing adjacent respective ends of the shaft;
   (c) sealing means disposed between the exhaust-driven turbine and the adjacent one of said bearings for blocking the passage of exhaust gasses into said housing;
(d) a first conduit in the housing communicating between an intake portion of the compressor and the adjacent one of said bearings;
(e) a second conduit in the housing communicating from outside the housing to a point inside the housing between said sealing means and said one of said bearings adjacent thereto; and,
(f) a hose connected between said fuel bowl and said second conduit, whereby as the turbocharger boost is increased the pressure in said bowl increases in pressure until it exceeds the pressure in said housing at which time the liquid fuel/oil mixture flows into said housing and through said bearings.

20. A turbocharger for use with a two-cycle engine having a fuel pump providing fuel under pressure at an output thereof and burning a liquid fuel/oil and air mixture comprising:
(a) a shaft mounted in a housing for rotation by an exhaust-driven turbine on one end to drive a compressor on the other end connected to supply air for the fuel/air mixture of the engine;
(b) a pair of ball bearings supporting the shaft for rotation within the housing adjacent respective ends of the shaft;
(c) sealing means disposed between the exhaust-driven turbine and the adjacent one of said bearings for blocking the passage of exhaust gasses into said housing;
(d) a first conduit in the housing communicating between an intake portion of the compressor and the adjacent one of said bearings;
(e) a second conduit in the housing communicating from outside the housing to a point inside the housing between said sealing means and said one of said bearings adjacent thereto; and,
(f) regulator valve means connected to receive fuel from said fuel pump and controlled by a line sensing intake manifold pressure of the engine for outputting fuel at an output thereof at a pressure directly related thereto; and,
(g) a hose connected between said output of said regulator valve means and said second conduit, whereby both lubrication of said bearings and enrichment of the fuel/air mixture to the engine increase and decrease in direct relationship to increases and decreases in the turbo boost being applied to the engine.

21. A lubrication system for a turbocharger for a two cycle engine having an oil and oil mist containing crankcase and burning a mixture of liquid fuel contaning lubricating oil therein wherein the turbocharger comprises a shaft mounted in a exhaust-driven turbine on one end to drive a compressor on the other end connected to supply pressurized air for the fuel/air mixture of the engine, comprising:
(a) a pair of ball bearings supporting the shaft within the housing adjacent respective ends of the shaft;
(b) sealing means disposed between the exhaust-driven turbine and the adjacent one of said bearings for blocking the passage of exhaust gasses into said housing;
(c) first conduit means in the housing communicating between an intake portion of the compressor and the other one of said bearings for creating a low pressure area adjacent said other one of said bearings;
(d) a source of the liquid fuel/oil mixture at a pressure directly related to the intake manifold pressure of the engine; and,
(e) second conduit means in the housing connecting said source to a point inside the housing between said sealing means and said adjacent one of said bearings adjacent thereto, whereby at least at high engine rpm's, fuel containing lubricating oil is allowed to pass through said bearings and out said first conduit to join the pressurized air being created by the compressor to provide lubrication and cooling of said bearings while simultaneously enriching the air/fuel mixture.

22. In a turbocharger for a two cycle engine having an oil and oil mist containing crankcase and burning a mixture of liquid fuel containing lubricating oil therein, wherein the turbocharger comprises a shaft mounted in a housing, by means of ball bearings disposed adjacent respective ends of said shaft, for rotation by an exhaust driven turbine on one end to drive a compressor on the other end of said shaft connected to supply air for the fuel/air mixture of the engine, the method of operation to supply lubrication to the shaft and automatically enrichen the fuel/air mixture during high speed turbo charging, comprising the steps of:
(a) preventing the passage of exhaust gases from the exhaust driven turbine into the shaft housing;
(b) drawing oil mist from said crankcase by vacuum pressure, created by said compressor, through said ball bearings, to an intake portion of said compressor to join pressurized air produced by the compressor; and
(c) drawing liquid fuel/oil mixture oil from a pressurized fuel source by pressure differential, created by said compressor, through said ball bearings when operating loads in said ball bearings render this desirable, to an air intake portion of said compressor, thereby to join pressurized air produced by the compressor, thereby to provide additional lubrication and cooling of the bearings while simultaneously enriching the air/fuel mixture provided to the engine.

23. The method of claim 22, wherein:
(a) the engine is a blow-through carbureted engine having at least one carburetor having a fuel bowl;
(b) said liquid fuel/oil mixture drawing step comprises increasing the pressure in the bowl as the turbo charger boost is increased until it exceeds the pressure in the housing, at which time the liquid fuel/oil mixture flows into the housing and through the bearings, and thence into the air intake portion of the compressor.

24. The method of claim 22, wherein:
(a) the engine is a non-blow-through engine employing fuel injection, or the like, using fuel under pressure from a fuel pump; and
(b) said fuel/oil mixture drawing step comprises regulating the supply of fuel from the fuel pump by the use of a regulator valve controlled by a line sensing intake manifold pressure of the engine for outputting fuel at an output thereof at a pressure directly related to the manifold pressure, whereby both lubrication of the bearings and enrichment of the fuel/air mixture to the engine increase and decrease in direct relationship to increases and decreases in the turbo boost being applied to the engine.

* * * * *